Figure 1:
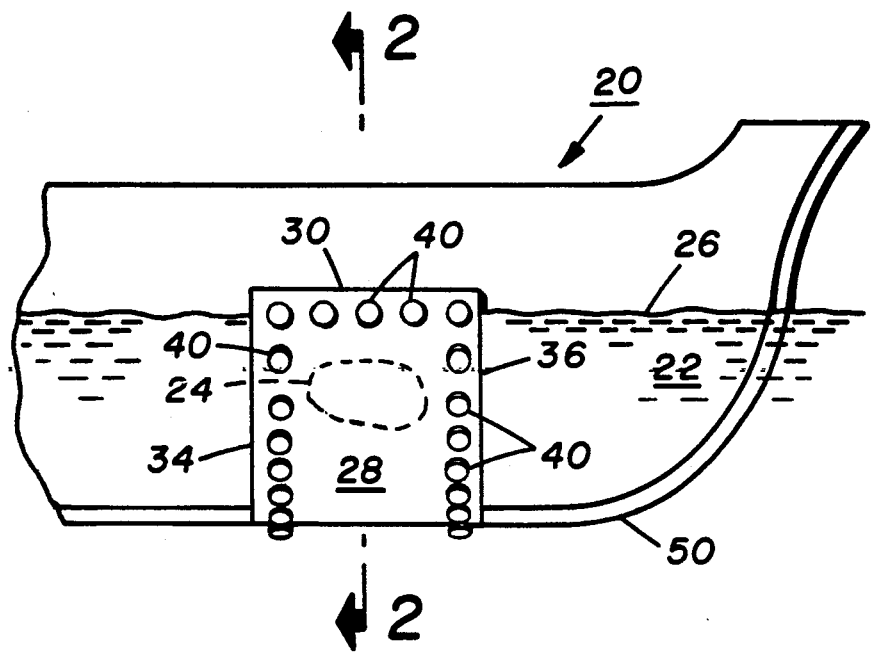

United States Patent [19]

Johnson

[11] Patent Number: 5,009,179
[45] Date of Patent: Apr. 23, 1991

[54] OIL SPILL CONTROL

[76] Inventor: Roscoe F. Johnson, 5650 N. Century Blvd., Century, Fla. 32535

[21] Appl. No.: 498,920

[22] Filed: Mar. 26, 1990

Related U.S. Application Data

[63] Continuation-in-part of Ser. No. 380,881, Jul. 17, 1989, abandoned.

[51] Int. Cl.⁵ .............................................. B63B 43/16
[52] U.S. Cl. .................................................... 114/229
[58] Field of Search .......................... 114/227–229, 114/74 R, 256; 405/60, 65

[56] References Cited

U.S. PATENT DOCUMENTS

| | | | |
|---|---|---|---|
| 770,078 | 9/1904 | Kruger | 114/229 |
| 2,240,567 | 5/1941 | Meacham et al. | 114/229 |
| 3,669,055 | 6/1972 | Bace | 114/229 |
| 3,756,294 | 9/1973 | Rainey | 141/392 |
| 3,785,321 | 1/1974 | Bankstrom | 114/74 R |
| 4,712,502 | 12/1987 | McDuff et al. | 114/229 |

FOREIGN PATENT DOCUMENTS 0035084  3/1977  Japan ................. 114/74 R

Primary Examiner—Sherman Basinger
Attorney, Agent, or Firm—Kelly O. Corley

[57] ABSTRACT

An oil-impermeable curtain is sealed to a vessel's hull at the top and lateral sides around a rupture, the bottom of the curtain being not sealed to the hull. This forms an open downwardly-facing pocket for containing oil leaking from the rupture.

5 Claims, 1 Drawing Sheet

OIL SPILL CONTROL

This is a continuation-in-part of copending application Ser. No. 380,881, filed Jul. 17, 1989 and now abandoned.

The invention relates to the art of containing oil spills, and more particularly to the art of stopping oil leaking from the ruptured hull of a vessel such as an oil tanker, the oil having a lower density than that of water.

Numerous devices have been suggested in the prior art directed to this problem. Many provided a patch or curtain which is sealed on all sides of the rupture, such as Frisbie U.S. Pat. No. 351,971, Weihe U.S. Pat. No. 381,302, Richardson U.S. Pat. No. 385,572, Buce U.S. Pat. No. 3,669,055, and McDuff U.S. Pat. No. 4,712,502. These suffer from needless complexity and/or limited effectiveness, as well as the difficulty of forming the bottom seal.

Another approach is disclosed in Kruger U.S. Pat. No. 770,078, wherein the bottom and sides of the curtain are sealed to the hull, the top being apparently unsealed. Again, the Kruger construction adds needless complexity by providing for the bottom seal.

Meacham U.S. Pat. No. 2,240,567 discloses a cofferdam construction wherein the curtain is suspended from floats and is sealed only at the lateral edges to the hull. The Meacham construction would be ineffective in rough water, however, since waves breaking over the tops of the floats and curtain would displace the supposedly contained oil.

Rainey U.S. Pat. No. 3,756,294 discloses a conduit having an inverted channel-shaped mouth for mating engagement with the surface of the vessel surrounding the sides and upper portion of the rupture, for entrapping and conveying the oil to a collector. The bottom portion of the mouth remains open to permit entry of water into the conduit to float the entrapped oil and accelerate its passage upwardly through the conduit. The Rainey construction has the drawback that the leak itself is not stopped, thus permitting flooding of the hull by seawater up to the level of the top of the rupture. This could result in sinking of the vessel. These and other difficulties with the prior art are avoided by the present invention, which provides an effective and relatively inexpensive solution to the problem.

According to a primary aspect of the invention, there is provided apparatus for stopping oil from leaking from a vessel having a hull, the hull having a laden waterline, the hull having a rupture, the apparatus comprising an imperforate oil-impervious sheet-like flexible curtain having a top edge, a bottom edge, and first and second opposed lateral edges. The curtain has a length from the top edge to the bottom edge, and has a width from the first to the second lateral edge, the length being greater than the height of the rupture and the width being greater than the width of the rupture. Top sealing means are provided for sealing the top edge to the hull, and lateral sealing means are provided for sealing the lateral edges to the hull on opposite sides of the rupture from levels below the rupture upwardly to the top edge. The botom edge remains mechanically unsealed to the hull. The curtain thus forms the hull a downwardly-facing open pocket means for containing the oil and preventing further leakage after the pocket is filled while permitting water to enter between the bottom edge and the hull.

According to another aspect of the invention, the top and lateral sealing means each comprise magnetic means for urging the respective top and lateral edges into sealing contact with the hull.

According to another aspect of the invention, the top edge is positioned substantially at the laden waterline.

According to another aspect of the invention, the vessel has a keel and the length is at least equal to the distance along the hull from the keel to the waterline.

Figure 2:
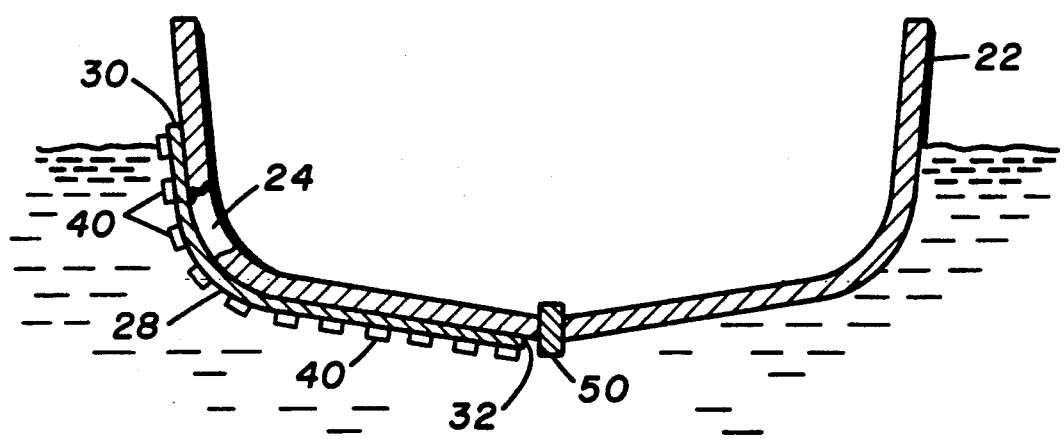

Other aspects will in part be disclosed hereinafter and will in part be apparent from the following detailed description taken together with the accompanying drawing, wherein:

FIG. 1 is a side elevation view of a vessel with the invention applied thereto; and FIG. 2 is a vertical sectional view taken along line 2—2 in FIG. 1.

As illustrated in FIG. 1, vessel 20 has hull 22 with a perforation or rupture 24 below laden waterline 26. Oil-impervious flexible sheet-like curtain 28 is provided to cover rupture 24 and thereby stop oil from leaking through rupture 24. A preferred material for curtain 28 is neoprene reinforced with embedded fabric, similar to the reinforcement of tires by embedded fabric.

Curtain 28 has top edge 30, bottom edge 32 (FIG. 2), first lateral edge 34, and second lateral edge 36. The distance from top edge 30 to bottom edge 32 is the length of curtain 28, while the distance from lateral edge 34 to lateral edge 36 is the width of curtain 28.

The length of curtain 28 is greater than the height of rupture 24, and the width of curtain 28 is greater than the width of rupture 24.

Top sealing means are provided for sealing top edge 30 to hull 22 above rupture 24, and lateral sealing means are provided for sealing lateral edges 34 and 36 to hull 22 on opposite sides of rupture 24 from levels below rupture 24 upwardly to top edge 30. Preferably each of the top and lateral sealing means include electromagnets 40 in the case of a conventional steel hull, but other means may be provided for urging first lateral edge 34, second lateral edge 36, and top edge 30 into sealing contact with hull 22.

According to the invention, bottom edge 32 remains mechanically unsealed to hull 22. Curtain 28 forms with hull 22 a downwardly-facing open pocket for containing the oil while permitting water to enter between bottom edge 32 and hull 22. This elimination of the seal for bottom edge 32 is made possible by taking advantage of the lower density of the oil as compared to the density of water. Oil escaping through rupture 24 will fill the inverted pocket formed by curtain 28 and hull 22 from at or below the bottom of rupture 24 to the top edge seal, thus preventing further leakage after the pocket is filled while water will fill the remainder of the pocket.

Since the oil cannot escape upwardly, it can no longer be displaced by water entering through rupture 24. No further water can enter the hull, preventing continuing flooding by water and possible sinking of the vessel.

In this construction, water forms the functional equivalent of a mechanical seal below rupture 24. The elimination of mechanical sealing means at the bottom of curtain 28 thus simplifies the structure without loss of function.

As shown in FIG. 2, bottom edge 32 may extend to the vicinity of keel 50 of hull 22 if rupture 24 is near the bottom of hull 22, so long as bottom edge 32 remains unsealed to hull 22.

The invention is likewise applicable in the case that the rupture is above the laden waterline, so long as lower edge 32 and the lateral seals of curtain 28 extend far enough below the laden waterline that the buoyancy of the oil trapped in the pocket below the waterline is sufficient to overcome the weight of the oil above the waterline.

I claim:

1. Apparatus for stopping oil from leaking from a vessel having a hull, said hull having an outer surface and having a laden waterline, said hull having a rupture, said apparatus comprising:
   A. an imperforate oil-impervious sheet-like flexible curtain having a top edge, a bottom edge, and first and second opposed lateral edges, said curtain having a length from said top edge to said bottom edge, said curtain having a width from said first to said second lateral edge;
   B. said length being greater than the height of said rupture and said width being greater than the width of said rupture;
   C. top sealing means for sealing said top edge to said outer surface of said hull above said rupture; and
   D. lateral sealing means for sealing said lateral edges to said outer surface of said hull on opposite sides of said rupture from levels below said rupture upwardly to said top edge;
   E. said bottom edge remaining mechanically unsealed to said hull, said curtain forming with said hull a downwardly-facing open pocket means for containing said oil and preventing further leakage after said pocket means is filled while permitting water to enter between said bottom edge and said hull.

2. The apparatus defined in claim 1, wherein said top and said lateral sealing means comprise magnetic means for urging said respective top edge and lateral edges into sealing contact with said hull.

3. The apparatus defined in claim 1, wherein said top edge is positioned substantially at said laden waterline.

4. The apparatus defined in claim 1, wherein said vessel has a keel, and wherein said length is at least equal to the distance along said hull from said keel to said waterline.

5. The apparatus defined in claim 1, wherein said curtain is formed from neoprene.

* * * * *